United States Patent
Rusch (10) Patent No.: US 7,680,805 B2
(45) Date of Patent: Mar. 16, 2010

(54) SYNCHRONIZATION METHOD FOR AN OBJECT ORIENTED INFORMATION SYSTEM (IS) MODEL

(75) Inventor: Gert Rusch, Eppelheim (DE)

(73) Assignee: SAP AG, Walldorf (DE)

( * ) Notice: Subject to any disclaimer, the term of this patent is extended or adjusted under 35 U.S.C. 154(b) by 270 days.

(21) Appl. No.: 11/026,776

(22) Filed: Dec. 30, 2004

(65) Prior Publication Data
US 2006/0149790 A1 Jul. 6, 2006

(51) Int. Cl.
*G06F 17/30* (2006.01)
(52) U.S. Cl. .................. 707/101; 707/100; 707/103 R; 707/201; 717/169
(58) Field of Classification Search .................. 717/169
See application file for complete search history.

(56) References Cited

U.S. PATENT DOCUMENTS

| | | | | |
|---|---|---|---|---|
| 5,594,642 | A * | 1/1997 | Collins et al. ................ | 715/535 |
| 6,061,723 | A | 5/2000 | Walker et al. | |
| 6,112,024 | A * | 8/2000 | Almond et al. ............. | 717/122 |
| 6,141,011 | A * | 10/2000 | Bodnar et al. ................ | 715/812 |
| 6,175,363 | B1 * | 1/2001 | Williams et al. ............. | 709/223 |
| 6,286,003 | B1 * | 9/2001 | Muta ............................ | 707/10 |
| 6,374,250 | B2 | 4/2002 | Ajtai et al. | |
| 6,560,719 | B1 * | 5/2003 | Pham et al. ................... | 707/204 |
| 6,651,248 | B1 * | 11/2003 | Alpern ......................... | 717/162 |
| 6,832,120 | B1 * | 12/2004 | Frank et al. .................. | 709/224 |
| 6,856,999 | B2 * | 2/2005 | Flanagin et al. ........... | 707/103 Y |
| 6,970,889 | B2 * | 11/2005 | Flanagin et al. ............. | 707/201 |
| 7,058,663 | B2 * | 6/2006 | Johnston et al. ............. | 707/200 |
| 7,130,779 | B2 * | 10/2006 | Beverina et al. ................ | 703/6 |
| 2002/0069399 | A1 * | 6/2002 | Miloushey et al. ........... | 717/108 |
| 2002/0103776 | A1 * | 8/2002 | Bella et al. ..................... | 706/49 |
| 2002/0116700 | A1 * | 8/2002 | Izurieta ...................... | 717/102 |
| 2002/0129175 | A1 * | 9/2002 | Banavar et al. ............. | 709/310 |
| 2003/0056205 | A1 * | 3/2003 | Miloushev et al. .......... | 717/162 |
| 2003/0198400 | A1 * | 10/2003 | Alderson et al. ............ | 382/274 |
| 2004/0139194 | A1 | 7/2004 | Naganathan | |
| 2004/0252128 | A1 * | 12/2004 | Hao et al. .................... | 345/581 |
| 2005/0138216 | A1 * | 6/2005 | Giles ............................ | 710/1 |

OTHER PUBLICATIONS

Ghamri-Doudane et al, "Hierarchical Policy Based Management Architecture to Support the Deployment and Discovery of Services in Ubiquitous Networks", Nov. 15, 2004, Proceedings of the 29th Annual IEEE International Conference on Local Computer Networks (LCN'04), p. 1-8. <Retrieved from IEEE Xplore on Dec. 11, 2008>.*

Struve et al, "State of the Art Review: Work Package 1", Sep. 2002, IT Frameworks (HormonIT), Contract EVK1-CT-2001-00090, HR Wallingford Report SR 598, 110 pages. <Retrieved from internet Dec. 11, 2008>.*

Ovil, "HP OpenView Data Extraction and Reporting", Feb. 22, 1999, Hewlett-Packard Company, Version 1.02, p. 1-87, <Retrieved from Examiner files Apr. 24, 2009>.*

Nathan J. Muller, "Focus on OpenView: A Guide to Hewlett-Packard's Network and Systems Management Platform", Dec. 1995, 305 pages, <Retrieved from Examiner files Apr. 24, 2009>.*

(Continued)

*Primary Examiner*—Khanh B Pham
(74) *Attorney, Agent, or Firm*—Blakely Sokoloff Taylor & Zafman LLP (57) ABSTRACT

A method is described that involves generating an update to an object-oriented model of an information system from information that describes a new state of the information system. The generating includes applying a synchronization rule for a sub-system identified within the information system. The synchronization rule indicates whether a new component within the sub-system that appears within the information is merged within the sub-system or replaces a component within the sub-system.

12 Claims, 7 Drawing Sheets

OTHER PUBLICATIONS

Hewlett-Packard Company, "HP OpenView MEasureWare Agent for Windows NT: User's Manual", Dec. 1999, 422 pages, <Retrieved from Examiner files Apr. 24, 2009>.*

Hp, "WHP Web Jetadmin Integration into HP OpenView Network Node Manager", Feb. 19, 2004, 12 pages,<Retrieved from Examiner files Apr. 24, 2009>.*

The DMTF Technical Committee, "The Common Information Model," CIM Version 2.7, Distriubted Management Task Force, Technical Note, Jan. 2003, 3 pages.

The DMTF Technical Committee, "The Value of the Common Information Model (Why CIM?)" CIM Version 2.7, Distriubted Management Task Force, Technical Note, Jan. 2003, 3 pages.

DMTF, Distrubted Management Task Force, Inc., Specification, DSP0004, "Common Information Model (CIM) Specfciation", Version 2.2, Jun. 14, 1999, 105 pages.

* cited by examiner

SYNCHRONIZATION METHOD FOR AN OBJECT ORIENTED INFORMATION SYSTEM (IS) MODEL

FIELD OF INVENTION

The field of invention relates generally to the software arts; and, more specifically, to a synchronization method for an object oriented Information System (IS) model.

BACKGROUND

An information system (also referred to as an "IS system") is an orchestrated collection of computing and networking hardware and software components designed to collectively support some kind of organization (e.g., a partnership, a corporation or a government institution). Advanced information system (IS) configuration and maintenance software tools are migrating to an environment in which detailed object oriented models for specific IS features (e.g., clients, servers, routers, software installations, hardware installations, etc.) are used to effect intelligent and automatic configuration and/or maintenance tasks. Examples include the efforts of the Web-Based Enterprise Management (WBEM) initiative and the Common Information Model (CIM) specification(s) (e.g., the Common Information Model (CIM) Specification published by the Distributed Management Task Force, Inc., Version 2.2, Jun. 14, 1999).

Figure 1:
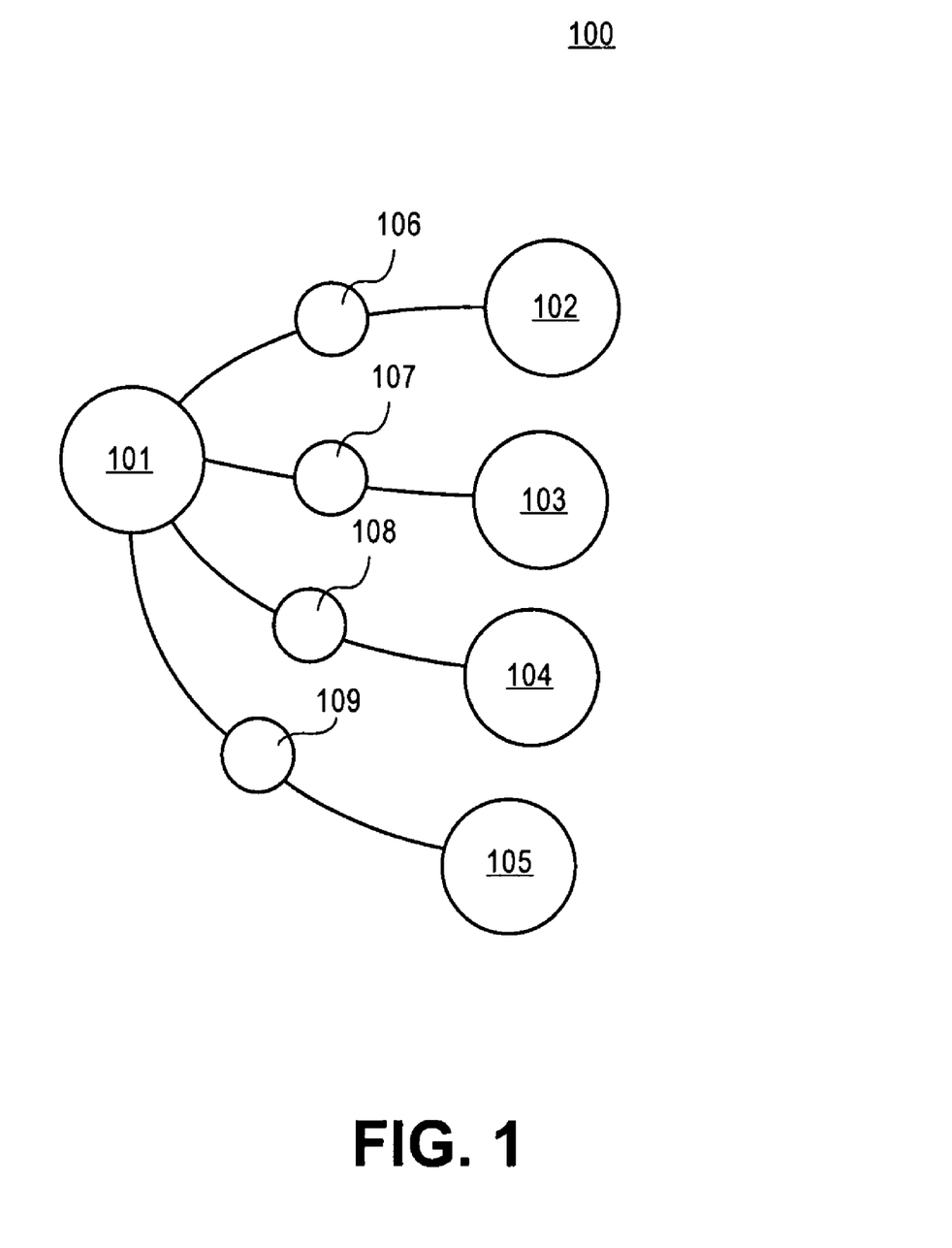
FIG. 1 shows an object oriented model for an IS component.

FIG. 1 shows an exemplary depiction of such an object oriented model 100. According to the depiction of FIG. 1, an object is used to represent a server having a dispatcher and worker nodes. Object 101 represents the dispatcher. Objects 102-105 represent the worker nodes and objects 106-109 represent associations between the worker nodes and the dispatcher.

In order to successfully implement maintenance and/or configuration tasks, live "tracking" of the state of an IS system (where, the IS system has two or more IS components having at least one association between them, where, a "component" is some identifiable unit of functionality) is often beneficial. A problem, however, is that the specific changes made to an IS system (e.g., by some kind of "event" (like a failure or bring-up)) may be "lost" or otherwise not presentable for purposes of updating a detailed object oriented model of the IS system to reflect the changes. If so, all that is available is the "new" state of the IS system (i.e., the state of the IS system after the change).

SUMMARY

A method is described that involves generating an update to an object-oriented model of an information system from information that describes a new state of the information system. The generating includes applying a synchronization rule for a sub-system identified within the information system. The synchronization rule indicates whether a new component within the sub-system that appears within the information is merged within the sub-system or replaces a component within the sub-system.

FIGURES

The present invention is illustrated by way of example and not limitation in the figures of the accompanying drawings, in which like references indicate similar elements and in which.

DETAILED DESCRIPTION

If all that is available is the "new" state of the IS system, the specific changes that need to be made to the object-oriented model in order to bring it up to date with the new IS system state must therefore be derived from the new state of the system. Of particular concern, is if a "new" component appears in the "new" state information relative to the "old" state information. In this case, a determination needs to be made as to whether the new component is to replace an existing component; or, is to be added to the IS system.

Figure 2:
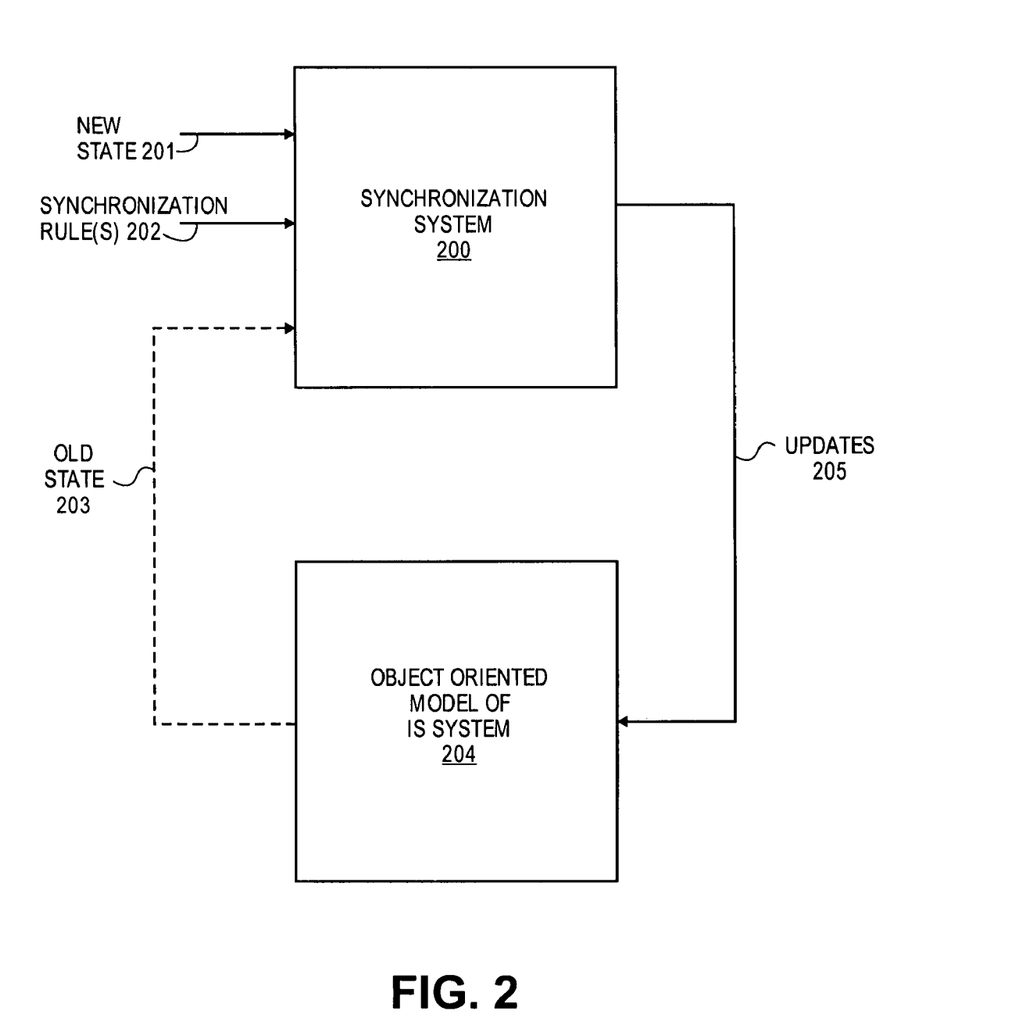
FIG. 2 shows a synchronization system that can introduce changes to an old IS system model from information describing a new IS system state.

FIG. 2 shows a depiction of an architecture for deriving updates 205 to be made to an object oriented model 204 of an IS system from information that describes the new IS system state rather than the specific changes that were made to the old IS system state. The state of the IS system is essentially a characterization of the IS system's various components including specific software installations, specific hardware installations and the various associations that may exist between software installations, between hardware installations as well as between software and hardware installations. Ideally, an object representing each pertinent IS system component is maintained in the object-oriented model of the IS system 204 that reflects the IS system's most recent state prior to its change(s).

According to the depiction of FIG. 2, information describing a new IS system state 201 and "synchronization rules" 202 are presented to the synchronization system 200. The information describing the new IS system state 201 describes, in some fashion, what the server "looks like" after the change(s) were made. The synchronization rules 202, as described in more detail below, provide guidance to the synchronization system 200 on how to apply the new IS system state information 201 toward the manufacture of one or more updates 205 to be made to the old object oriented model 204. The synchronization system 200 also receives information from the old object oriented model 204 as a baseline for comprehending the changes made to the IS system in light of the new IS system state information 201.

The new IS system state 201 can be reflected with various data structures including text pages such as .XML pages. The old IS system state 203 that is received by the synchronization system 200 can literally be the objects associated with the present object oriented model 204, or other information derived from the old object oriented model 204 such as text pages including .XML pages.

Figure 3:
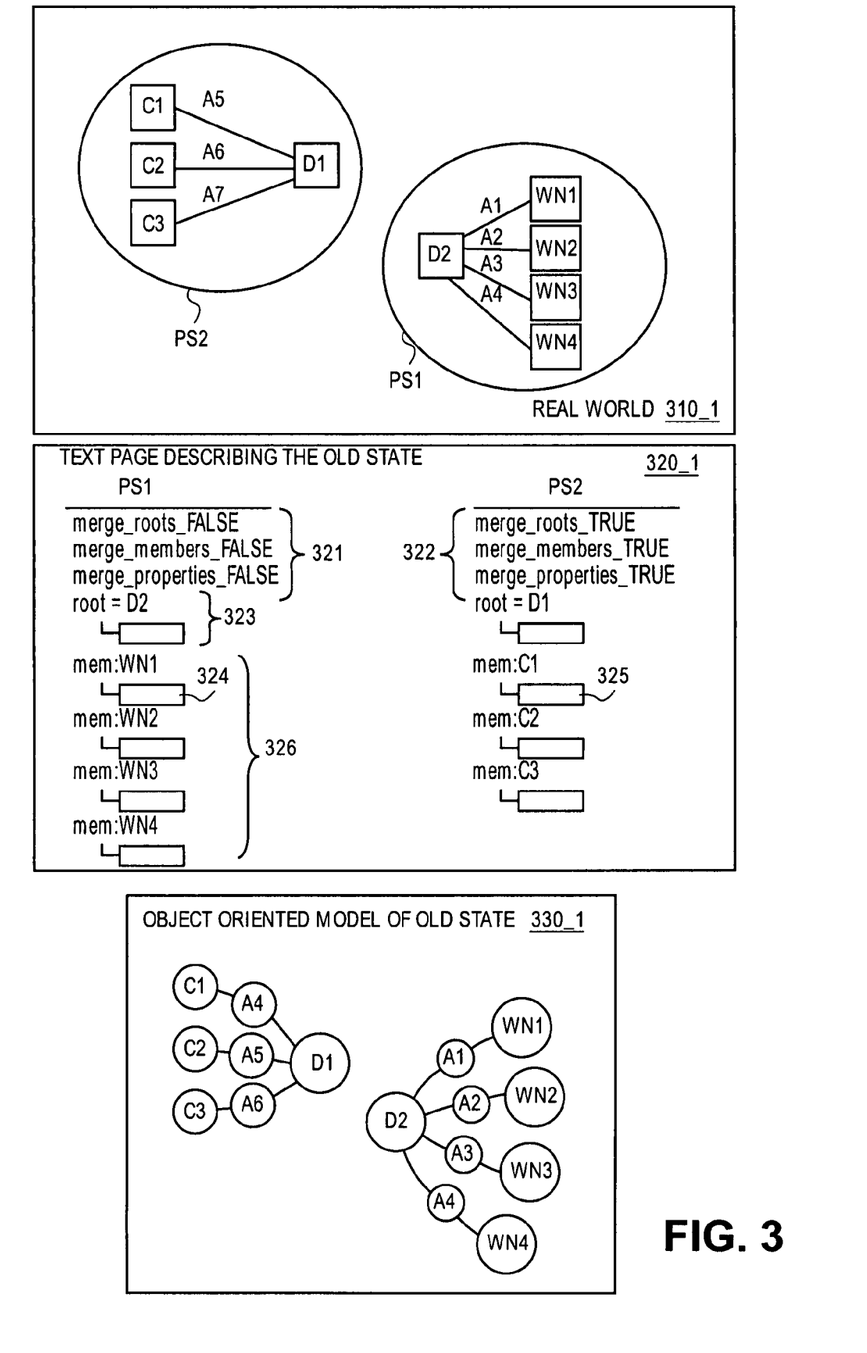
FIG. 3 shows an exemplary "old" IS system state and corresponding representations thereof.

FIG. 3 shows information pertaining to an example of an "old" IS system state. Firstly, inset 310_1 shows a "real world" depiction that is meant to convey the actual "old" state of an exemplary IS system. By contrast, inset 320_1 and inset 330_1 are meant to show different manners in which the real world state of inset 310_1 can be described so that automated systems management tools (including synchronization system 200 as described above) can perform automated management functions (e.g., configuration, maintenance, etc.). Specifically, inset 320_1 corresponds to a text page that has been written to reflect the real world state 310_1; and, inset 330_1 corresponds to a collection of model objects in an object oriented environment organized through their various references to one another to reflect the real work state 310_1.

The exemplary real world IS system 310_1 includes a dispatcher D2 that distributes HTTP requests across four worker nodes WN1, WN2, WN3, WN4; and, three clients C1, C2, C3 that are communicatively engaged with another dispatcher D1. Each worker node may include, for example, a virtual machine (VM), a web application container and an Enterprise Java Beans container. The text page representation 320_1 of the IS system describes the system by identifying pertinent components of the IS system according to a specific outline. Importantly, certain "planetary systems" (PS) within the IS system can be understood from the text page's outline.

Here, a planetary system is essentially a sub-system within the overall IS system where one or more IS system components (called "members") that have a specific relationship with another IS system component (called a "root"). A first planetary system PS1 is recorded in the text page 320_1 with respect to the dispatcher D2 and the four worker nodes WN1, WN2, WN3, WN4. The first planetary system PS1 identifies: 1) the "root" of the planetary system as the dispatcher of name D2 323; 2) each "member" of the planetary system (worker nodes WN1, WN2, WN3 and WN4); and, 3) synchronization rules 321 (merge_roots_FALSE, merge_members_FALSE, merge_properties_TRUE) which as described further below give the synchronization system guidance on how to handle information describing a new IS system state as it pertains to components within planetary system PS1. In an embodiment, each member in a planetary system has a same set of properties. Thus, in the case of planetary system PS1, the set of properties for member WN1 is the same as that found in the set of properties for members WN2, WN3 and WN4, respectively. Note that property fields describing various properties of the planetary system's components are observed (e.g., property field 324 that describes properties of member WN1 (e.g., the virtual machine version of WN1)).

For simplicity, associations A1 through A4 between members WN1 through WN4 and root member D2 are observed in real world depiction 310_1 but not text page representation 320_1. Generally, as will become evident further below, the use of the "merge" flags permit successful synchronization where associations are recorded in an IS system's "old" state information but not in an IS system's "new" state information. Thus, because, text page representation is being presented herein as an "old" system state representation, the A1 through A4 associations should be present but have not been drawn for illustrative simplicity.

A second planetary system PS2 is recorded in the text page 320_1 with respect to the dispatcher D1 and the three clients C1, C2 and C3. The second planetary system PS2 identifies: 1) the "root" of the planetary system as the dispatcher of name D1; 2) each "member" of the planetary system (clients C1, C2 and C3); 3) synchronization rules 322 (merge_roots_TRUE, merge_members_TRUE, merge_properties_TRUE) which as described further below give the synchronization system guidance on how to handle information describing a new IS system as it pertains to planetary system PS2. Again, note that property fields describing various properties of the planetary system's components are observed (e.g., property field 325 for member pair WN1). Like planetary system PS1, the associations A5 through A7 of planetary system are not depicted in the text representation 320_1 but may be assumed to be recorded there.

Figure 4:
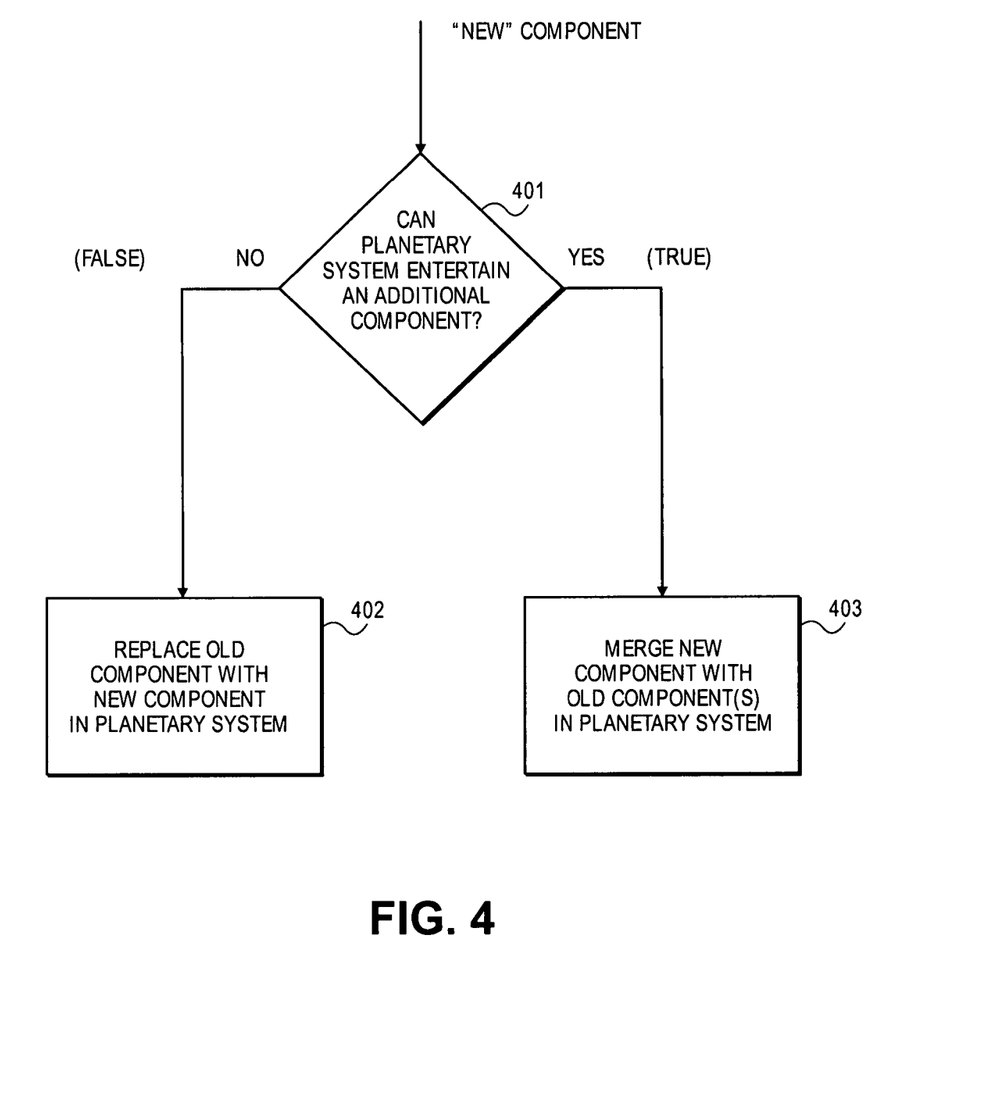
FIG. 4 shows a method to establish the synchronization rules for a "planetary system" that is tracked by the synchronization system of FIG. 2.

Comparison of the text file description of the two planetary systems reveals that the PS1 planetary system has its "merge_roots" and "merge_members" synchronization rules set to FALSE and planetary system PS2 has its "merge_roots" and "merge_members" synchronization rules set to TRUE. FIG. 4 reveals a basic methodology that demonstrates the differences between the TRUE and FALSE settings.

According to the methodology of FIG. 4, if a planetary system (or the presented new state information) is of such a character that it cannot entertain the addition of a new component 401 of a certain type, then, the appearance of a "new" component of that type in the planetary system's "new" state information is understood to be the replacement 402 for an existing component of that type in the planetary system (i.e., the new component replaces a component rather than merges with one or more existing components of the same type within the planetary system, hence the "merge" parameter is set to "FALSE"). Referring back to FIG. 2, the replacement of an "old" planetary system component with a "new" planetary system component corresponds to the update 205 that is made by the synchronization system 201 to the old state information 204.

In the example set forth below, the PS1 system is assumed to be a four CPU server that is configured to have only one worker node (WN) per CPU. Moreover, the server is configured to have only one dispatcher (D) that provides HTTP requests to its constituent worker nodes. According to this server architecture, planetary system PS1 can only entertain a single dispatcher and a maximum of only four worker nodes. Thus, referring to the parameter settings 321 in the server state representation 320_1 of FIG. 3, the "merge_roots" parameter of the PS1 planetary system is set to FALSE because the appearance of a "new" dispatcher in the new state information for the PS1 planetary system must actually correspond to a replacement of the "old" dispatcher (because the server can only entertain a single dispatcher); and, for similar reasons, the "merge_members" parameter of the PS1 system is set to FALSE because the introduction of a "new" worker node list in the new state information of the PS1 planetary system must actually correspond to a replacement of the "old" worker node list because the server "knows them all".

By contrast, if a planetary system (or the presented new state information) is of such a character that it can entertain the addition of a new component 401 of a certain type, then, the appearance of a "new" component of that type in the planetary system's "new" state information is understood to be an additional component of that type to be added 403 to the planetary system rather than a replacement 402 for an existing component of that type in the planetary system (i.e., the new component is added to the already pre-existing planetary system, hence the "merge" parameter is set to "TRUE"). Referring back to FIG. 2, the addition of a "new" planetary system component to an "old" planetary system corresponds to the update 205 that is made by the synchronization system 201 to the old state information 204.

In the example set forth below, it is assumed that the PS2 planetary system describes the relationship between multiple clients and one or more dispatchers within the IS system, respectively. Here, one or more clients may be added at any time to reflect the addition of a new customer of the IS system. Likewise, it is possible for any client to engage in a communicative session with more than one dispatcher. Hence, referring to the parameter settings 322 in the server state representation 320_1 of the PS2 system in FIG. 3, the "merge_members" and "merge_roots" rules are both set to TRUE. That is, the appearance of a new client/member in the new system state information will simply be added to the PS2 planetary system and the appearance of a new dispatcher/root will simply be added to the PS2 planetary system.

In summary then, referring to FIG. 2, the synchronization rules 202 effectively tell the synchronization system 200 what type of update 205 should be manufactured in light of a detected difference between the old system state 203 and the new system state 201. Here, according to one methodology, the synchronization system 200 operates as follows: 1) compare old system state information 203 with new system state information 201 to identify a difference that corresponds to a "new" component that appears in the new system state information 201 but not the old system state information 203; 2) add the "new" component to the old state information 203; 3) if the applicable merge parameter is FALSE: remove a component that appeared in the old state information 203 to effect its replacement with the new component found in the new state information 201; or, if the applicable merge parameter is TRUE: perform no such removal to effect the pure addition of the new component to the old system state information 203. The update 205 is applied to the object oriented model of the old state 204 accordingly.

Figure 5:
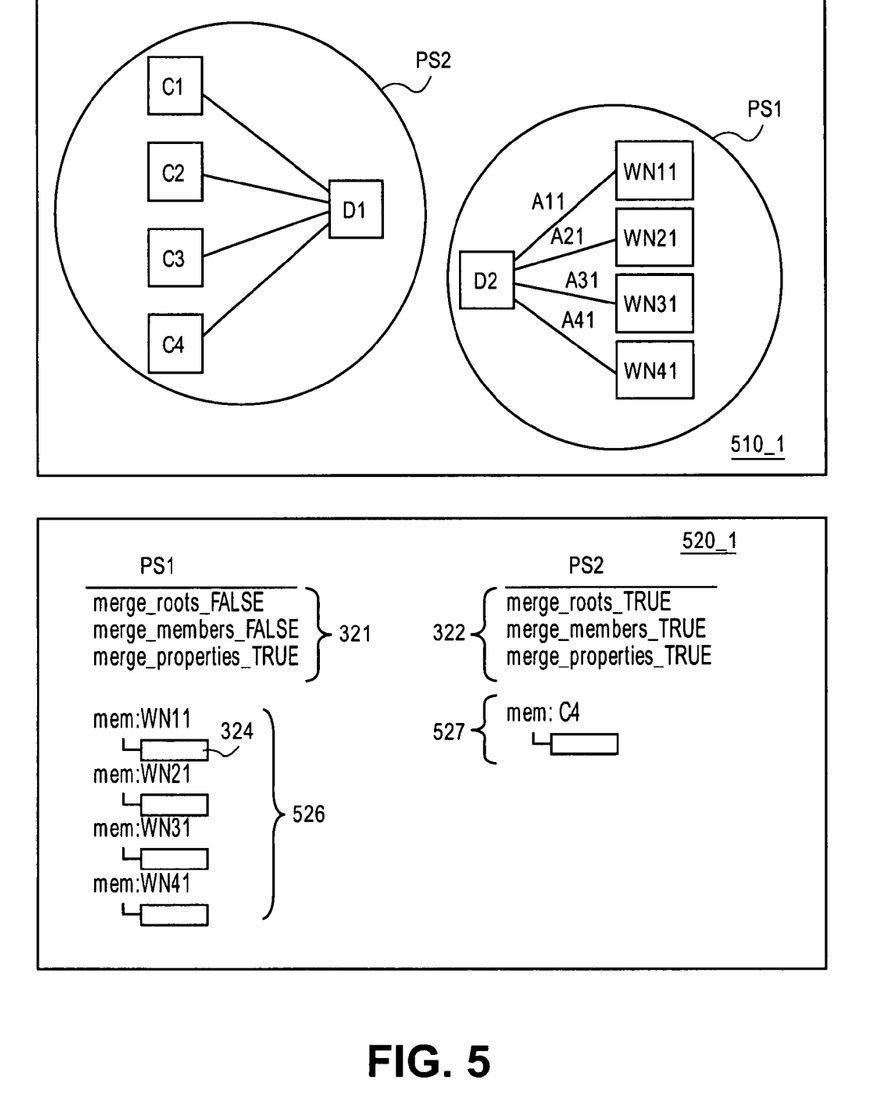
FIG. 5 shows a first exemplary "new" IS system state relative to the IS system state observed in FIG. 3.
Figure 6:
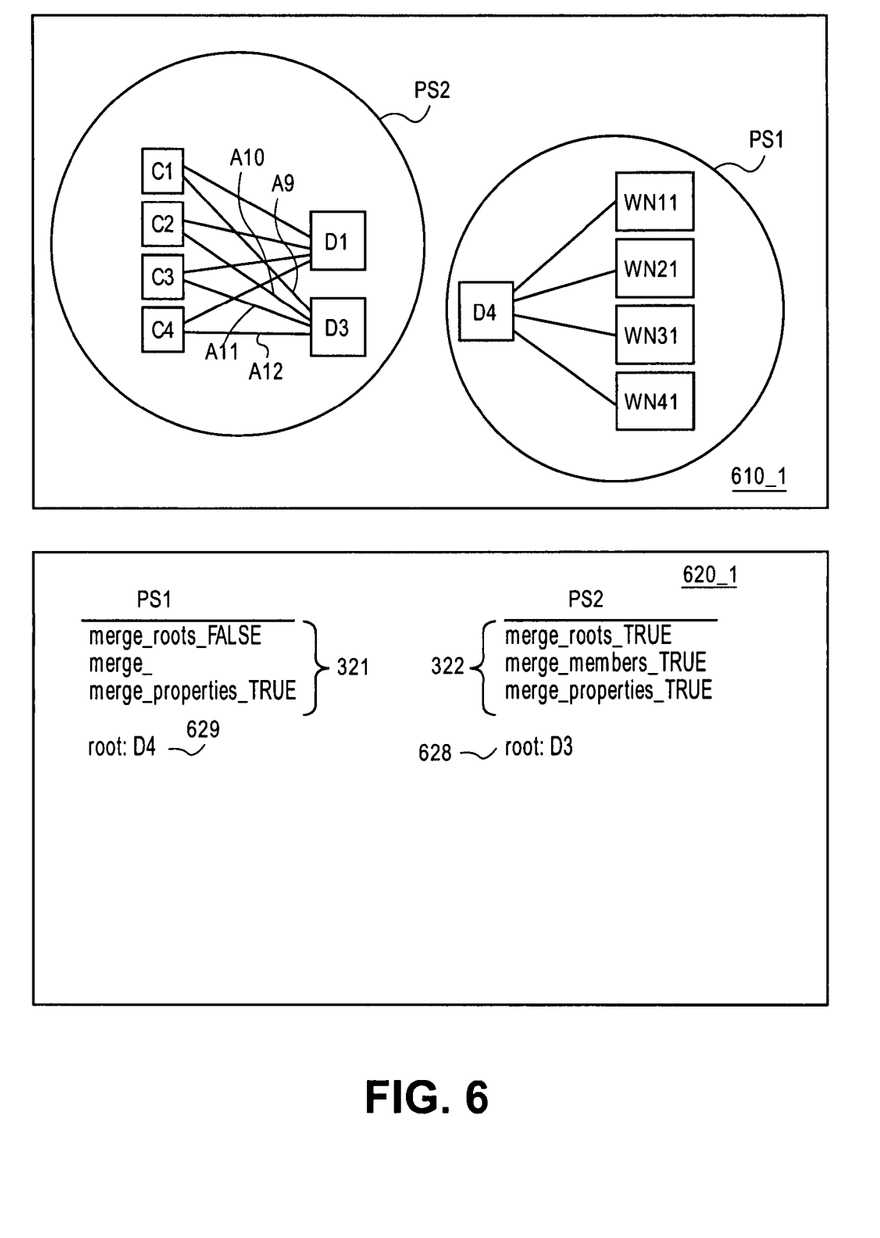
FIG. 6 shows a second exemplary "new" IS system state relative to the IS system state observed in FIG. 5.

FIGS. 5 through 6 demonstrate examples based on the old system of FIG. 3. FIG. 5 depicts at inset 510_1 a new system state that is to be compared to the old system state 310_1 of FIG. 3; and, depicts at inset 520_2 pertinent aspects of the corresponding new state information. Specifically note that, for simplicity, inset 520_2 only shows the specific differences that would be detected between the old state information and the new state information (i.e., the entire new state of the system depicted at inset 510_1 is not shown). According to inset, planetary system PS1 is provided with four new worker nodes WN11 through WN41 526; and, planetary system PS2 is provided with a new client C4 527.

As described above, because the "merge_members" rules are set to FALSE for the PS1 system and TRUE for the PS2 system, the WN11 through WN41 worker nodes of FIG. 5 would replace the WN1 through WN4 worker nodes of FIG. 3; while, the C4 client of FIG. 5 would be added to the C1 through C3 clients of planetary system of FIG. 3. The former may, for example, correspond to some kind of upgrade (e.g., a new virtual machine or application software suite); while, the later simply corresponds to another client that is using the IS system.

Here, note that a specific semantic is illustrated in which the old A1 through A4 associations to worker nodes W1 through W4 are effectively cut in place of new associations A11 through A41 to worker nodes W11 through W41. Such a result could be established, for instance, if the synchronization system first adds new worker nodes W11 through W41 with corresponding new associations A11 through A41 before cutting worker nodes W1 through W4 and corresponding associations A1 through A4 from the PS1 planetary system representation.

FIG. 6 at inset 610_1 corresponds to the system state of FIG. 5 after a new dispatcher D3 628 is added to the PS2 planetary system. Here, because the PS2 system represents client/dispatcher relationships, its merge_roots rule is set to TRUE which effectively incorporates the D3 dispatcher into the PS2 planetary system without replacing dispatcher D1. Here, associations A9 though A12 are also added by the synchronization system along with the D3 dispatcher to the PS2 planetary system.

Also shown in FIG. 6 is the introduction of a new dispatcher D4 629 to the PS1 planetary system. Here, because of the merge_roots parameter being set to false for the PS1 system, the introduction of the D4 dispatcher in the new system data is understood to be a replacement for the D2 dispatcher. As such, the synchronization system will remove D2 from the PS1 planetary system, cut the A11 through A41 associations, add the D4 dispatcher to the PS1 planetary system, and introduce new associations A12 through A42.

Note that the merge_properties rules may work in the same fashion as described above. That is, certain properties of a root and/or member(s) are kept in the old system state record (e.g., the "old" object oriented model); and, the presentation of the new state information includes "new" properties for the root and/or member(s). A setting of FALSE means the new property information replaces the old property information and a setting of TRUE means the new property information is merged with the old property information.

According to one implementation, referring back to FIG. 2, the synchronization system 200 includes at least one director and a network of builders. The builders are responsible for generating "output" corresponding to one or more of the updates 204 themselves and/or "input" that is used by one or more other builders. The director is responsible for directing terms and/or values from the new server state information 201 and from the old server state information 202 to the appropriate builders at the appropriate times such that an organized flow progresses from the old and new server states 201, 202 to the actual updates 204 that need to be made.

According to a further embodiment, additional synchronization rules are applied to the synchronization system 200 that define what should be done with a root or member that has had an association to it cut. For any cut association to a root or member, a synchronization rule setting of ALL means that the root or member should be cut/removed as well even if the root or member is coupled to other associations after the cut association is cut; a synchronization rule setting of LONE means the root or member should be cut/removed only if the cut association is the only association to the root or member (i.e., the root or member is "alone" with no other associations after the cut association is cut); a synchronization rule setting of NONE means that the root or member is not cut/removed even if the cut association is the only association to the root or member (i.e., the root or member is allowed to exist without any associations to it).

Processes taught by the discussion above may be performed with program code such as machine-executable instructions which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
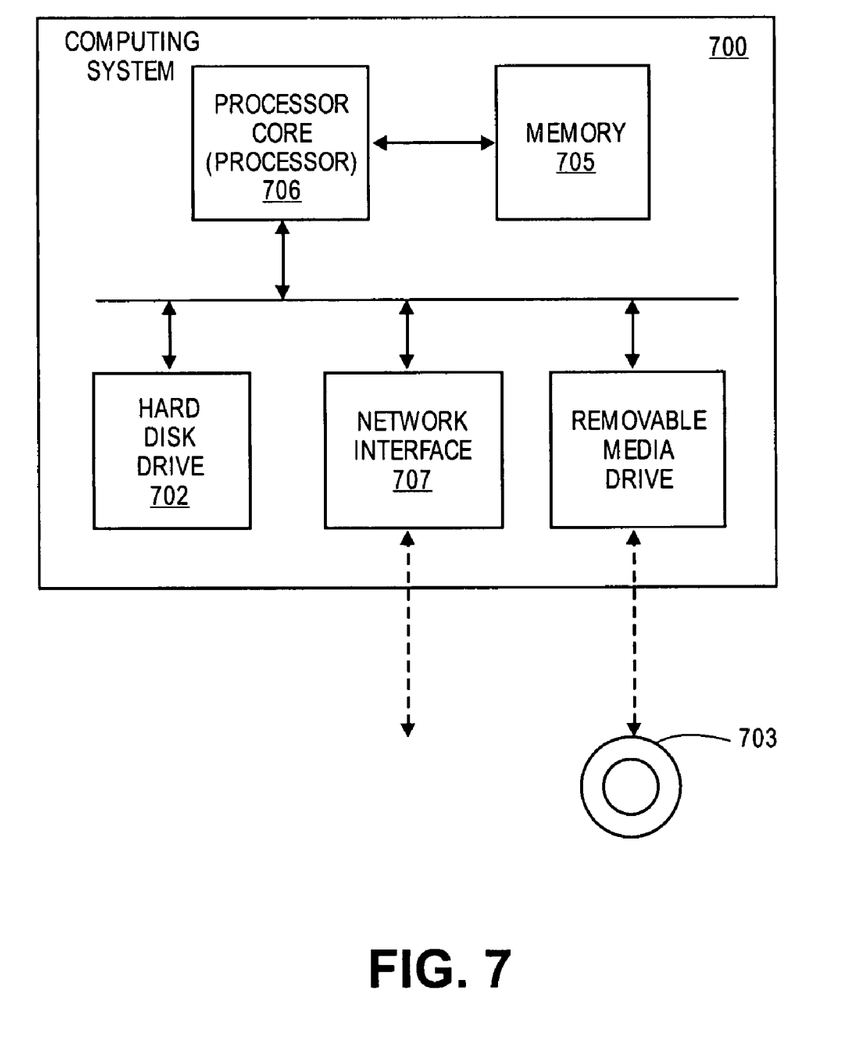
FIG. 7 shows an embodiment of a computing system.

FIG. 7 is a block diagram of a computing system 700 that can execute program code stored by an article of manufacture.

It is important to recognize that the computing system block diagram of FIG. 7 is just one of various computing system architectures. The applicable article of manufacture may include one or more fixed components (such as a hard disk drive 702 or memory 705) and/or various movable components such as a CD ROM 703, a compact disc, a magnetic tape, etc. In order to execute the program code, typically instructions of the program code are loaded into the Random Access Memory (RAM) 705; and, the processing core 706 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 706.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
reading program code from memory and processing said program code with one or more processors to perform the following:
creating an object oriented model of a server, said server being a component of an information system composed at least of multiple servers and software installations, said server having a dispatcher and a worker node, said dispatcher to dispatch (Hyper Text Transfer Protocol) HTTP requests to said worker node, said object oriented model of said server including object oriented representations of said dispatcher and said worker node, said worker node implemented with a virtual machine and one of said server's CPUs;
comparing a new description of said information system with an old description of said information system, said new description embodied as computer readable text documentation, said text documentation incorporating a description of a hierarchy that includes a root node having a constituent member node, said text documentation identifying said dispatcher as said root node and said worker node as said member node, said text documentation including a synchronization rule for said server, said synchronization rule specifying that a new member node replaces said member node;
identifying new configuration state information for said server from said comparing of said new and old descriptions of said information system, said new configuration state information indicating that a new worker node exists within said server, said new worker node implemented with a new virtual machine for said one CPU;
in response to said identifying of said new configuration state information, referring to said synchronization rule and, based on said synchronization rule, generating an update for said object oriented model that specifies said new worker node replaces said worker node; and,
creating a new object oriented model for said server by updating said object oriented model with said update;
comparing second old and new descriptions of said information system to identify additional new configuration state information for said server, said additional new configuration state information indicating that a new dispatcher exists within said server, said second new description of said information system embodied as a second computer readable text documentation that includes a second synchronization rule for said server, said second synchronization rule specifying that a new root node replaces said root node;
in response to said identifying of said additional new configuration state information, referring to said second synchronization rule, and, based on said second synchronization rule, generating a second update that specifies said new dispatcher replaces said dispatcher; and,
generating another new object oriented model for said server by updating said new model with said second update.

2. The method of claim 1 wherein said second synchronization rule coexists with said first synchronization rule on said text documentation.

3. The method of claim 2 further comprising:
creating a second object oriented model that represents a second server within said information system, said second server having a second dispatcher and a client node;
identifying new configuration state information for said second server from said comparing of said new and old descriptions of said information system, said new configuration state information for said second server indicating that a new dispatcher node exists within said second server, said text documentation incorporating a description of a second hierarchy for said second server that includes a second root node and a second constituent member node, said text documentation identifying said second dispatcher as said second root node and said client node as said second member node, said text documentation including a synchronization rule for said second server, said synchronization rule for said second server specifying that said second member node is not replaced by another member node;
in response to said identifying of said new configuration state information for said second server, referring to said synchronization rule for said second server and, and, based on said synchronization rule for said second server, generating a second update that specifies said second server's new dispatcher is added to said second server without replacing said second dispatcher; and,
creating a new object oriented model for said second server by updating said second object oriented model with said second update.

4. The method of claim 3 wherein said synchronization rule for said second server coexists on said text documentation with said synchronization rule and said second synchronization rule for said server.

5. A machine readable storage medium containing program code which, when read from memory and executed by one or more processors, causes a method to be performed, said method comprising:
reading program code from memory and processing said program code with one or more processors to perform the following:
creating an object oriented model of a server, said server being a component of an information system composed at least of multiple servers and software installations, said server having a dispatcher and a worker node, said dispatcher to dispatch (Hyper Text Transfer Protocol) HTTP requests to said worker node, said object oriented model of said server including object oriented representations of said dispatcher and said worker node, said worker node implemented with a virtual machine and one of said server's CPUs;

comparing a new description of said information system's state with an old description of said information system's state, said new description of said information system's state embodied as computer readable text documentation, said text documentation incorporating a description of a hierarchy that includes a root node having a constituent member node, said text documentation identifying said dispatcher as said root node and said worker node as said member node, said text documentation including a synchronization rule for said server, said synchronization rule specifying that a new member node replaces said member node;

identifying new configuration state information for said server from said comparing of said new and old descriptions of said information system, said new configuration state information indicating that a new worker node exists within said server, said new worker node implemented with a new virtual machine for said one CPU;

in response to said identifying of said new configuration state information, referring to said synchronization rule and, based on said synchronization rule, generating an update for said object oriented model that specifies said new worker node replaces said worker node; and, creating a new object oriented model for said server by updating said object oriented model with said update;

comparing second old and new descriptions of said information system to identify additional new configuration state information for said server, said additional new configuration state information indicating that a new dispatcher exists within said server, said second new description of said information system's state embodied as a second computer readable text documentation that includes a second synchronization rule for said server, said second synchronization rule specifying that a new root node replaces said root node;

in response to said identifying of said additional new configuration state information, referring to said second synchronization rule, and, based on said second synchronization rule, generating a second update that specifies said new dispatcher replaces said dispatcher; and, generating another new object oriented model for said server by updating said new model with said second update.

6. The machine readable storage medium of claim 5 wherein said second synchronization rule coexists with said first synchronization rule on said text documentation.

7. The machine readable storage medium of claim 6 wherein said method further comprises:

creating a second object oriented model that represents a second server within said information system, said second server having a second dispatcher and a client node;

identifying new configuration state information for said second server from said comparing of said new and old descriptions of said information system, said new configuration state information for said second server indicating that a new dispatcher node exists within said second server, said text documentation incorporating a description of a second hierarchy for said second server that includes a second root node and a second constituent member node, said text documentation identifying said second dispatcher as said second root node and said client node as said second member node, said text documentation including a synchronization rule for said second server, said synchronization rule for said second server specifying that said second member node is not replaced by another member node;

in response to said identifying of said new configuration state information for said second server, referring to said synchronization rule for said second server and, and, based on said synchronization rule for said second server, generating a second update that specifies said second server's new dispatcher is added to said second server without replacing said second dispatcher; and, creating a new object oriented model for said second server by updating said second object oriented model with said second update.

8. The machine readable storage medium of claim 7 wherein said synchronization rule for said second server coexists on said text documentation with said synchronization rule and said second synchronization rule for said server.

9. A computer system comprising:

memory and one or more processors, said memory containing program code which, when read from said memory and processed by said one or more processors, causes a method to be performed, said method comprising:

reading program code from memory and processing said program code with one or more processors to perform the following:

creating an object oriented model of a server, said server being a component of an information system composed at least of multiple servers and software installations, said server having a dispatcher and a worker node, said dispatcher to dispatch (Hyper Text Transport Protocol) HTTP requests to said worker node, said object oriented model of said server including object oriented representations of said dispatcher and said worker node, said worker node implemented with a virtual machine and one of said server's CPUs;

comparing a new description of said information system's state with an old description of said information system's state, said new description of said information system's state embodied as computer readable text documentation, said text documentation incorporating a description of a hierarchy that includes a root node having a constituent member node, said text documentation identifying said dispatcher as said root node and said worker node as said member node, said text documentation including a synchronization rule for said server, said synchronization rule specifying that a new member node replaces said member node;

identifying new configuration state information for said server from said comparing of said new and old descriptions of said information system, said new configuration state information indicating that a new worker node exists within said server, said new worker node implemented with a new virtual machine for said one CPU;

in response to said identifying of said new configuration state information, referring to said synchronization rule and, based on said synchronization rule, generating an update for said object oriented model that specifies said new worker node replaces said worker node; and, creating a new object oriented model for said server by updating said object oriented model with said update;

comparing second old and new descriptions of said information system to identify additional new configuration state information for said server, said additional new configuration state information indicating that a new dispatcher exists within said server, said second new description of said information system's state embodied as a second computer readable text documentation that includes a second synchronization rule for said server, said second synchronization rule specifying that a new root node replaces said root node;

in response to said identifying of said additional new configuration state information, referring to said second synchronization rule, and, based on said second synchronization rule, generating a second update that specifies said new dispatcher replaces said dispatcher; and, generating another new object oriented model for said server by updating said new model with said second update.

10. The computer system of claim 9 wherein said second synchronization rule coexists with said first synchronization rule on said text documentation.

11. The computer system of claim 10 wherein said method further comprises:

creating a second object oriented model that represents a second server within said information system, said second server having a second dispatcher and a client node;

identifying new configuration state information for said second server from said comparing of said new and old descriptions of said information system, said new configuration state information for said second server indicating that a new dispatcher node exists within said second server, said text documentation incorporating a description of a second hierarchy for said second server that includes a second root node and a second constituent member node, said text documentation identifying said second dispatcher as said second root node and said client node as said second member node, said text documentation including a synchronization rule for said second server, said synchronization rule for said second server specifying that said second member node is not replaced by another member node;

in response to said identifying of said new configuration state information for said second server, referring to said synchronization rule for said second server and, and, based on said synchronization rule for said second server, generating a second update that specifies said second server's new dispatcher is added to said second server without replacing said second dispatcher; and, creating a new object oriented model for said second server by updating said second object oriented model with said second update.

12. The computer system of claim 11 wherein said synchronization rule for said second server coexists on said text documentation with said synchronization rule and said second synchronization rule for said server.

* * * * *